US011561082B2

United States Patent
Li et al.

(10) Patent No.: US 11,561,082 B2
(45) Date of Patent: Jan. 24, 2023

(54) METHOD FOR COMPENSATION DURING THE PROCESS OF WAVEFRONT RECONSTRUCTION IN GRATING-BASED LATERAL SHEARING INTERFEROMETRY

(71) Applicant: Shanghai Institute of Optics And Fine Mechanics, Chinese Academy of Sciences, Shanghai (CN)

(72) Inventors: Peng Li, Shanghai (CN); Feng Tang, Shanghai (CN); Xiangzhao Wang, Shanghai (CN); Yunjun Lu, Shanghai (CN); Yang Liu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 17/525,624

(22) Filed: Nov. 12, 2021

(65) Prior Publication Data
US 2022/0412720 A1    Dec. 29, 2022

(30) Foreign Application Priority Data

Jun. 28, 2021   (CN) .......................... 202110720859.X (51) Int. Cl.
*G01B 9/02098*   (2022.01)
(52) U.S. Cl.
CPC ...... *G01B 9/02098* (2013.01); *G01B 2290/50* (2013.01)
(58) Field of Classification Search
CPC ............. G01B 11/162; G01B 9/02098; G01B 2290/50
See application file for complete search history.

(56) References Cited

U.S. PATENT DOCUMENTS

| 2002/0159048 A1* | 10/2002 | Inoue | G01J 9/00 356/121 |
| 2016/0047710 A1* | 2/2016 | Maeda | G01B 21/045 356/512 |
| 2020/0363573 A1* | 11/2020 | De Groot | G01M 11/0271 |
| 2021/0364929 A1* | 11/2021 | Hsu | G03F 7/70525 |

FOREIGN PATENT DOCUMENTS

CN           104111120 B      5/2017

OTHER PUBLICATIONS

Southwell, William H., "Wave-front estimation from wave-front slope measurements," JOSA, 70:8, pp. 998-1006 (1980).
C. Elster et al., "Exact wave-front reconstruction from two lateral shear interferograms," J. Opt. Soc. Am., A 16, pp. 2281-2285 (1999).
Miyakawa, Ryan, "Wavefront metrology for high resolution optical systems," Diss. U.C. Berkeley (2011).

* cited by examiner

*Primary Examiner* — Michael P LaPage
(74) *Attorney, Agent, or Firm* — Mei & Mark LLP; Manni Li (57) ABSTRACT

Method for simultaneously compensating pupil coordinate distortion and shear amount change in a process of wavefront reconstruction in grating transverse shear interference. Where a wavefront is diffracted by a grating, the shapes and light paths of the diffracted wavefronts of all the orders are different, so that on one hand, a coordinate system detected by a detector plane is distorted relative to a pupil coordinate system, and on the other hand, a shear amount changes along with a coordinate position.

6 Claims, 5 Drawing Sheets

METHOD FOR COMPENSATION DURING THE PROCESS OF WAVEFRONT RECONSTRUCTION IN GRATING-BASED LATERAL SHEARING INTERFEROMETRY

CROSS-REFERENCE TO RELATED APPLICATIONS

The subject application claims priority to Chinese Patent Application No. 202110720859.X filed on Jun. 28, 2021, in China. The Chinese priority application is incorporated herein by reference.

TECHNICAL FIELD

The present invention relates optical testing, particularly, a wavefront reconstruction method, and more particularly, a method for simultaneously compensating pupil coordinate distortion and shear amount change in a process of wavefront reconstruction in grating transverse shear interference.

BACKGROUND ART

In the grating-based lateral shearing interferometer, a wavefront to be measured is diffracted by a grating and then propagates along different diffraction directions to form diffracted wavefronts of different orders. The projections of different diffracted wavefronts on a detector are not the same, and when any two diffracted wavefronts are subjected to shear interference, shear amounts corresponding to shear interference phases at different positions are also different. The phenomenon is particularly obvious in the application of wave aberration detection in large NA optical systems, which needs to be compensated to obtain correct detection results.

Wavefront reconstruction algorithms are mainly classified as zonal algorithms and model algorithms. When using the shear phase to reconstruct the phase of the wavefront to be measured, both the algorithms require the system shear be a constant value. For example, the least-square wavefront reconstruction algorithm (see Southwell, William H., "Wave-front estimation from wave-front slope measurements," JOSA, 70:8, pp: 998-1006 (1980)), which is a typical representation of the zonal algorithm, requires a fixed shear amount in the process of building a set of constraining equations so that the obtained discrete data can be connected in series into different sub-grids and solved; also, the FFT reconstruction algorithm, a typical representation of the model algorithm (see C. Elster et al., "Exact wave-front reconstruction from two lateral shear interferograms," J. Opt. Soc. Am., A 16, pp. 2281-2285 (1999)), has its logic based on the premise that the shear amount is unchanged and does not work if the shear distribution is not uniform.

To address the change of shear distribution with position in wave aberration detection of large NA optical systems, the least-square wavefront reconstruction algorithm can be optimized (see Miyakawa, Ryan, "Wavefront metrology for high resolution optical systems," Diss. U.C. Berkeley (2011)), for example, to use the directly detected shear phase to estimate the shear phase by linear interpolation, and the wavefront reconstruction is then performed. The method solves the problem concerning the principle of the least-square wavefront reconstruction algorithm, however, it not only increases the computational complexity, but also limits the accuracy of the results, because it includes a large deal of linear estimation operations.

SUMMARY OF THE INVENTION

The invention overcomes the defects of the existing technology by providing a method for simultaneously compensating pupil coordinate distortion and shear amount change in the process of wavefront reconstruction in grating transverse shear interference. According to the method of the present invention, a coordinate correspondence relation between the shear interference phase and the phase of the wavefront to be measured is established by using an inverse solving algorithm, a polynomial fitting matrix is further built by using the relation, and a fitting result of expressing the wavefront to be measured by using the polynomials can be directly obtained by through a least-square method.

The technical solution of the invention is as follows:

The method for simultaneously compensating pupil coordinate distortion and shear amount change in a process of wavefront reconstruction in grating transverse shear interference, comprises the following steps:

(1) generating a differential wavefront interferogram of an optical system to be measured in X and Y-directions by using a grating transverse shear interferometer, and receiving differential wavefront interferograms $I_x(x_d, y_d)$ and $I_y(x_d, y_d)$ by using a two-dimensional photoelectric sensor, wherein $(x_d, y_d)$ is a pixel position coordinate system on the two-dimensional photoelectric sensor;

(2) extracting diffracted wavefronts of $n_1$-order and $n_2$-order, and differential phases $S_x(x_d, y_d)$ and $S_y(x_d, y_d)$ in X and Y-directions from the generated differential wavefront interferograms, wherein $n_1 \neq n_2$ and both are an integer;

(3) using an inversing method to solve corresponding position coordinates of light rays received by different pixels on a two-dimensional photoelectric sensor plane in a pupil plane along diffraction light paths of $n_1$ and $n_2$ orders in the case of shearing in the X-direction and the Y-direction, respectively, wherein the position coordinates obtained in the case of shearing in the X-direction are $(x_{n1x}, y_{n1x})$ and $(x_{n2x}, y_{n2x})$, and the position coordinates obtained in the case of shearing in the Y-direction are $(x_{n1y}, y_{n1y})$ and $(x_{n2y}, y_{n2y})$;

(4) selecting first m (m>1) polynomials to build a set of equations according to the obtained coordinate systems $(x_{n1x}, y_{n1x})$, $(x_{n2x}, y_{n2x})$ $(x_{n1y}, y_{n1y})$, $(x_{n2y}, y_{n2y})$, and solving to obtain a coefficient $C_i$ (i=1, 2, . . . , m) corresponding to each polynomial when the wavefront to be measured is expressed by the selected polynomials;

(5) reconstructing a wavefront $W_F$ according to the following Equation:

$$W_F = \sum_{i=1}^{m} C_i Z_i,$$

wherein $Z_i$ represents an i-th polynomial;

(6) outputting the reconstruction result $W_F$.

In the present invention, the grating transverse shear interferometer is a four-wave grating shear interferometer, a Talbot grating shear interferometer, or a Ronchi grating shear interferometer.

In the present invention, the differential phase of the diffracted wavefronts of the $n_1$ and $n_2$ orders is the differential phase between the diffracted wavefronts of 0 and ±1 orders, respectively, or the differential phase between the diffracted wavefronts of the −1 and +1 orders.

In the present invention, the inversing method used is a light ray tracing method or an iterative method.

In the present invention, the polynomial is a Zernike polynomial, a differential Taylor polynomial, or a Seidel aberration expression.

In the present invention, the process of solving the coefficient $C_i$ in step (4) comprises the steps of building a set of equations for the differential phases $S_{xk}$ and $S_{yk}$ in the X-direction and Y-direction detected on a k-th pixel of the two-dimensional photoelectric sensor:

$$S_{xk} = \sum_{i=1}^{m} C_i \cdot (Z_{ik}^{n1x} - Z_{ik}^{n2x})$$

$$S_{yk} = \sum_{i=1}^{m} C_i \cdot (Z_{ik}^{n1y} - Z_{ik}^{n2y}),$$

wherein upper right corner indices n1x, n2x, n1y, and n2y of Z respectively indicate that a value of a corresponding term is derived by substituting a k-th coordinate point in the coordinate systems $(x_{n1x}, y_{n1x})$, $(x_{n2x}, y_{n2x})$, $(x_{n1y}, y_{n1y})$, and $(x_{n2y}, y_{n2y})$ into a selected i-th polynomial expression; a lower right corner index i represents the i-th polynomial, and k represents that the value of the term is a value corresponding to the k-th coordinate in the selected coordinate system; sorting data detected by all pixels on the two-dimensional photoelectric sensor to obtain a set of equations as follows:

$$\begin{vmatrix} Z_{11}^{n1x}-Z_{11}^{n2x} & Z_{21}^{n1x}-Z_{21}^{n2x} & & Z_{i1}^{n1x}-Z_{i1}^{n2x} \\ Z_{12}^{n1x}-Z_{12}^{n2x} & Z_{22}^{n1x}-Z_{22}^{n2x} & \cdots & Z_{i2}^{n1x}-Z_{i2}^{n2x} \\ \vdots & \vdots & & \vdots \\ Z_{1k}^{n1x}-Z_{1k}^{n2x} & Z_{2k}^{n1x}-Z_{2k}^{n2x} & & Z_{ik}^{n1x}-Z_{ik}^{n2x} \\ Z_{11}^{n1y}-Z_{11}^{n2y} & Z_{21}^{n1y}-Z_{21}^{n2y} & \cdots & Z_{i1}^{n1y}-Z_{i1}^{n2y} \\ Z_{12}^{n1y}-Z_{12}^{n2y} & Z_{22}^{n1y}-Z_{22}^{n2y} & & Z_{i2}^{n1y}-Z_{i2}^{n2y} \\ \vdots & \vdots & & \vdots \\ Z_{1k}^{n1y}-Z_{1k}^{n2y} & Z_{2k}^{n1y}-Z_{2k}^{n2y} & \cdots & Z_{ik}^{n1y}-Z_{ik}^{n2y} \end{vmatrix} \cdot \begin{vmatrix} C_1 \\ C_2 \\ \vdots \\ C_i \end{vmatrix} = \begin{vmatrix} S_{x1} \\ S_{x2} \\ \vdots \\ S_{xk} \\ S_{y1} \\ S_{y2} \\ \vdots \\ S_{yk} \end{vmatrix},$$

and solving a least-square solution of the above set of equations, i.e., the coefficients $C_i$. The present invention has advantages over the existing technology where (1) the invention can be applied to a situation where the shear amount changes; (2) the method can compensate the shear amount change and the coordinate distortion simultaneously; and (3) under the condition that the detection system parameters are constant, it would be enough to calculate the coordinate transformation relation for once, so the method of the invention features minimal calculation complexity and a faster process wavefront reconstruction.

DETAILED DESCRIPTION OF THE INVENTION

The present invention is further described below with reference to examples and drawings, but the scope of the invention should not be limited thereto.

Example 1

Figure 1:
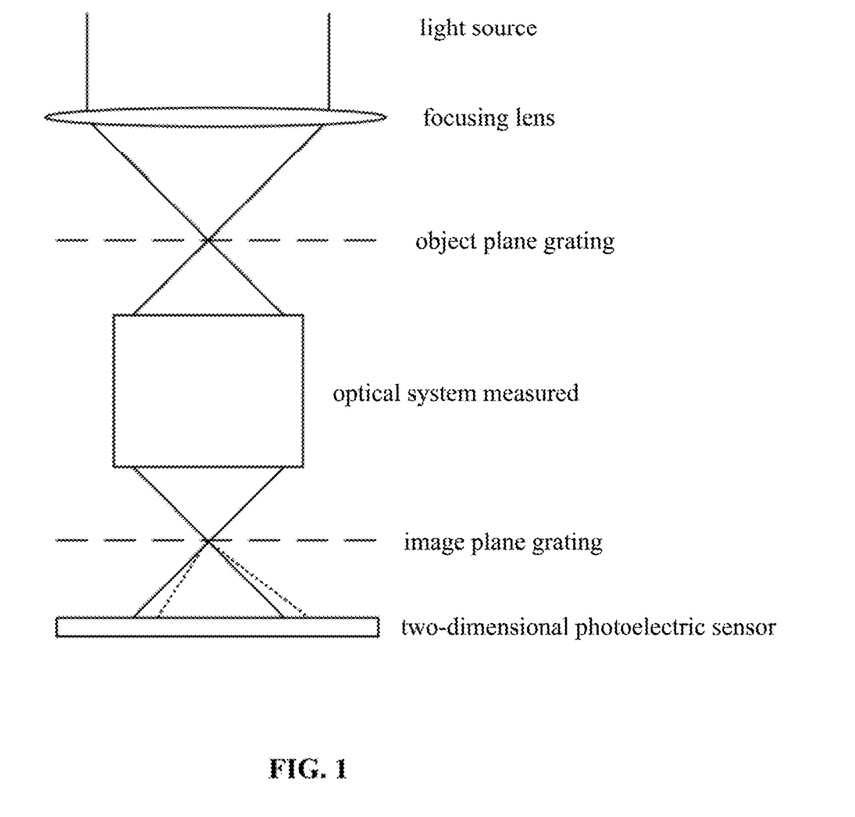
FIG. 1 shows the experimental light path related to Example 1 of the present invention.
Figure 2:
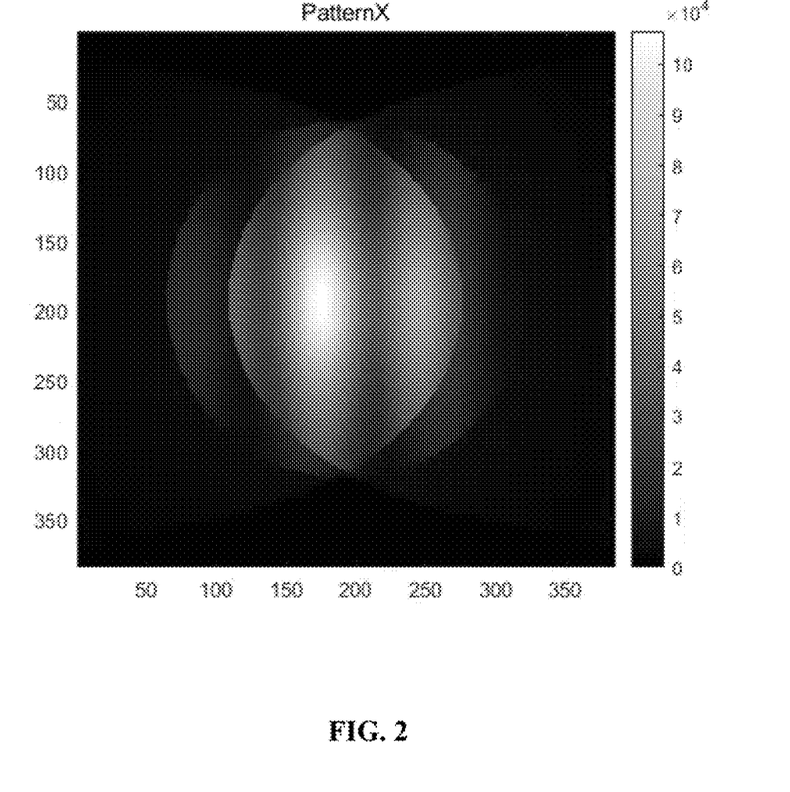
FIG. 2 shows the shear interferogram in an X-direction obtained in Example 1 of the present invention.
Figure 3:
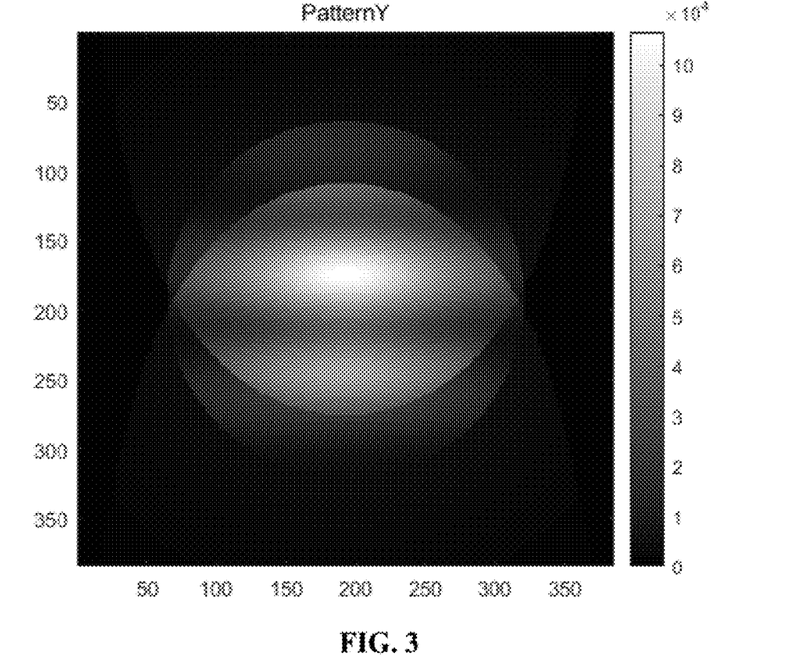
FIG. 3 shows the shear interferogram in a Y-direction obtained in Example 1 of the present invention.
Figure 4:
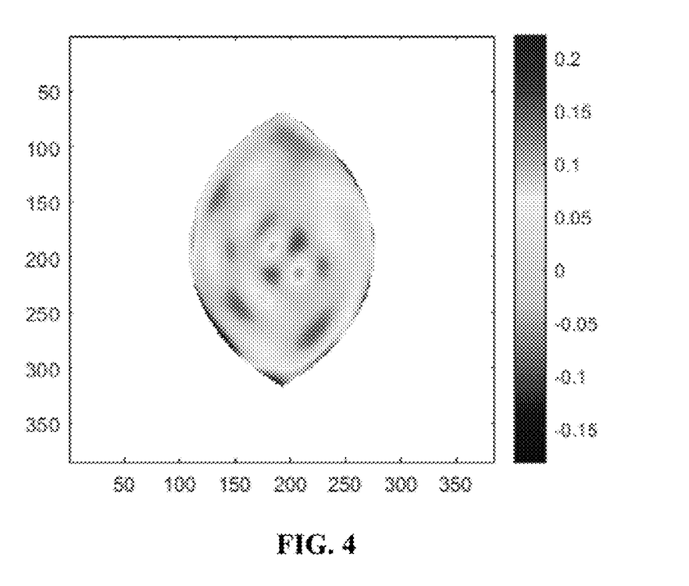
FIG. 4 shows the shear interferogram in the X-direction in Example 1 of the present invention.
Figure 5:
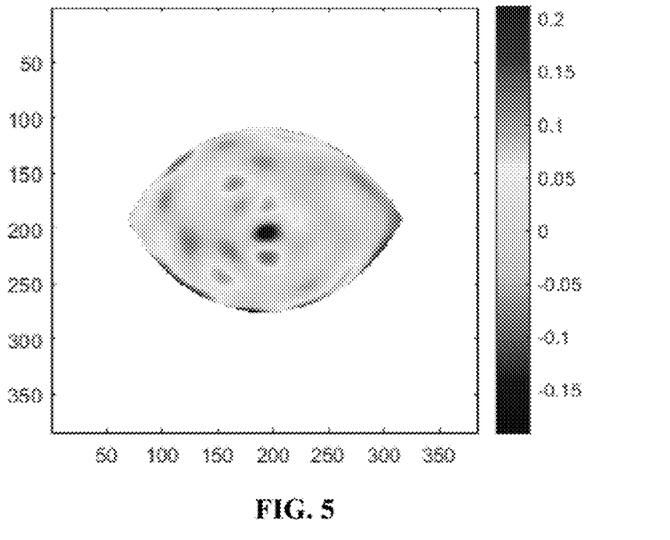
FIG. 5 shows the shear interferogram in the Y-direction in Example 1 of the present invention.
Figure 6:
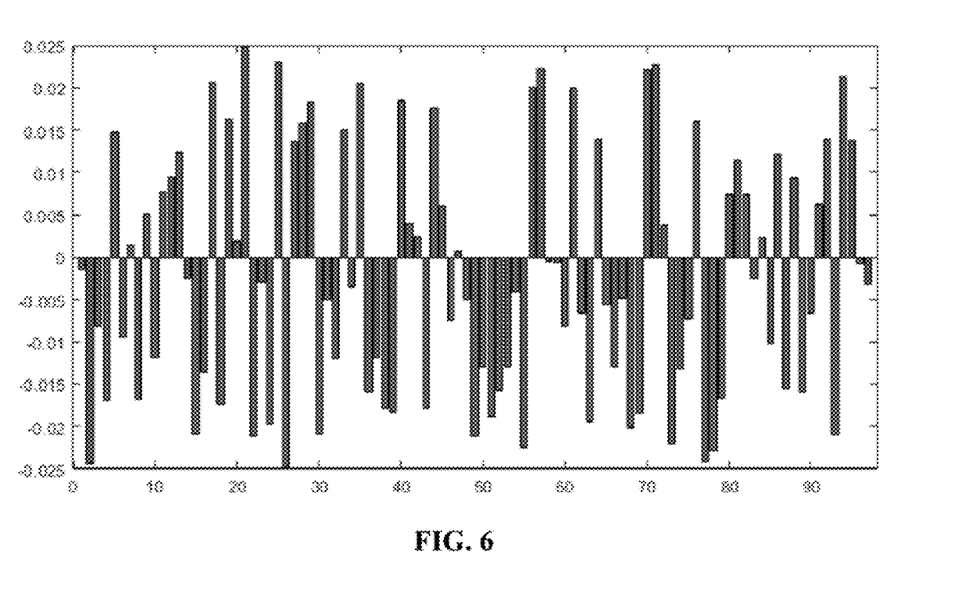
FIG. 6 shows the a fitting coefficient derived in Example 1 of the present invention.

Wave aberration of a projection objective lens system is measured by using a Ronchi grating shear interferometer as shown in FIG. 1, where a focusing lens, an object plane grating (period T=20 μm), a projection objective lens system to be measured (NA=0.9), an image plane grating (period T=5 μm) and a two-dimensional photoelectric sensor are sequentially arranged along a light-ray-propagation direction of a light source (wavelength λ=532 nm); the object plane grating is positioned in a rear focal plane of the focusing lens; a front focal plane of the projection objective lens system to be measured coincides with the rear focal plane of the focusing lens; the image plane grating is positioned on the rear focal plane of the projection objective lens system to be measured; the two-dimensional photoelectric sensor is parallel to the image plane grating, and a distance from the two-dimensional photoelectric sensor to the image plane grating meets the requirement that a sampling number of the diffraction light rays of the 0 order is 256×256 pixels. The measurement steps are as follows:

(1) a grating transverse shear interferometer is used for generating a differential wavefront interferogram of the wave aberration of the projection objective lens system to be measured in an X-direction and a Y-direction, and the two-dimensional photoelectric sensor is used for receiving interferograms $I_x(x_d, y_d)$ and $I_y(x_d, y_d)$ as shown in FIGS. 2 and 3;

(2) the differential phases $S_x(x_d, y_d)$ and $S_y(x_d, y_d)$ of the diffracted wavefronts of −1 and +1 orders in the X-direction and the Y-direction are extracted from the resulting interferogram by using the methods disclosed in Chinese Patent No. CN104111120B published on May 31, 2017, (inventors are Wu, Feibin et al.; applicant is Shanghai Institute of Optics and Fine Mechanics, Chinese Academy of Sciences), which is incorporated by reference herewith, as shown in FIGS. 4 and 5;

(3) points where paths through which the light rays emitted from different positions on a pupil plane intersect a detector plane are tracked along paths of the diffracted light rays of the −1 and +1 orders in the case of shearing in the X-direction and the Y-direction, respectively, and the positions on the selected pupil plane are continuously adjusted to enable the points where the light rays intersect the detector plane to fall on designated pixels, so that the corresponding position coordinates of light rays received by different pixels on a two-dimensional photoelectric sensor plane in the pupil plane are obtained, wherein the position coordinates obtained in the case of shearing in the X-direction are $(x_{-1x}, y_{-1x})$ and $(x_{+1x}, y_{+1x})$, and the position coordinates obtained in the case of shearing in the Y-direction are $(x_{-1y}, y_{-1y})$ and $(x_{+1y}, y_{+1y})$;

first 100 Zernike polynomials are selected to build a set of equations according to the obtained coordinate systems $(x_{-1x}, y_{-1x})$, $(x_{+1x}, y_{+1x})$, $(x_{-1y}, y_{-1y})$, and $(x_{+1y}, y_{+1y})$, and solving to obtain a Zernike coefficient $C_i$ (i=1, 2, ..., 100) corresponding to each Zernike polynomial when the wavefront to be measured is expressed by the selected Zernike polynomials; specifically, a set of equations is built for the differential phases $S_{xk}$ and $S_{yk}$ in the X-direction and Y-direction detected on a k-th pixel of the two-dimensional photoelectric sensor:

$$S_{xk} = \sum_{i=1}^{100} C_i \cdot \left(Z_{ik}^{+1x} - Z_{ik}^{-1x}\right)$$

$$S_{yk} = \sum_{i=1}^{100} C_i \cdot \left(Z_{ik}^{+1y} - Z_{ik}^{-1y}\right)$$

where upper right corner indices +1x, −1x, +1y, and −1y of Z respectively indicate that a value of a corresponding term is derived by substituting a k-th coordinate point in the coordinate systems $(x_{-1x}, y_{-1x})$, $(x_{+1x}, y_{+1x})$, $(x_{-1y}, y_{-1y})$, and $(x_{+1y}, y_{+1y})$ into a selected i-th Zernike polynomial expression; a lower right corner index i represents the i-th Zernike polynomial, and k represents that the value of the term is a value corresponding to the k-th coordinate in the selected coordinate system; data detected by all pixels on the two-dimensional photoelectric sensor are sorted to obtain a set of equations as follows:

$$\begin{vmatrix} Z_{11}^{+1x} - Z_{11}^{-1x} & Z_{21}^{+1x} - Z_{21}^{-1x} & & Z_{100,1}^{+1x} - Z_{100,1}^{-1x} \\ Z_{12}^{+1x} - Z_{12}^{-1x} & Z_{22}^{+1x} - Z_{22}^{-1x} & \cdots & Z_{100,2}^{+1x} - Z_{100,2}^{-1x} \\ \vdots & \vdots & & \vdots \\ Z_{1k}^{+1x} - Z_{1k}^{-1x} & Z_{2k}^{+1x} - Z_{2k}^{-1x} & & Z_{100,k}^{+1x} - Z_{100,k}^{-1x} \\ Z_{11}^{+1y} - Z_{11}^{-1y} & Z_{21}^{+1y} - Z_{21}^{-1y} & \cdots & Z_{100,1}^{+1y} - Z_{100,1}^{-1y} \\ Z_{12}^{+1y} - Z_{12}^{-1y} & Z_{22}^{+1y} - Z_{22}^{-1y} & & Z_{100,2}^{+1y} - Z_{100,2}^{-1y} \\ \vdots & \vdots & & \vdots \\ Z_{1,65536}^{+1y} - Z_{1,65536}^{-1y} & Z_{2,65536}^{+1y} - Z_{2,65536}^{-1y} & \cdots & Z_{100,65536}^{+1y} - Z_{100,65536}^{-1y} \end{vmatrix} \cdot \begin{vmatrix} C_1 \\ C_2 \\ \vdots \\ C_{100} \end{vmatrix} = \begin{vmatrix} S_{x1} \\ S_{x2} \\ \vdots \\ S_{x,65536} \\ S_{y1} \\ S_{y2} \\ \vdots \\ S_{y,65536} \end{vmatrix},$$

and a least-square solution of the above set of equations is solved to obtain the coefficient $C_i$, as shown in FIG. 6.

(4) A reconstructed wavefront $W_F$ obtained from the coefficient solution $C_i$ is:

$$W_F = \sum_{i=1}^{100} C_i Z_i,$$

where $Z_i$ represents the i-th Zernike polynomial.

Figure 7:
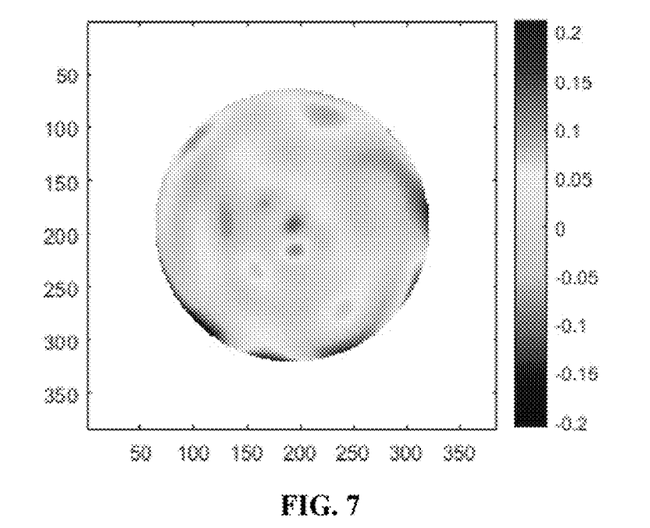
FIG. 7 shows the phase to be measured reconstructed in Example 1 of the present invention.

(5) The reconstruction result $W_F$ is output, as shown in FIG. 7.

Example 2

Figure 8:
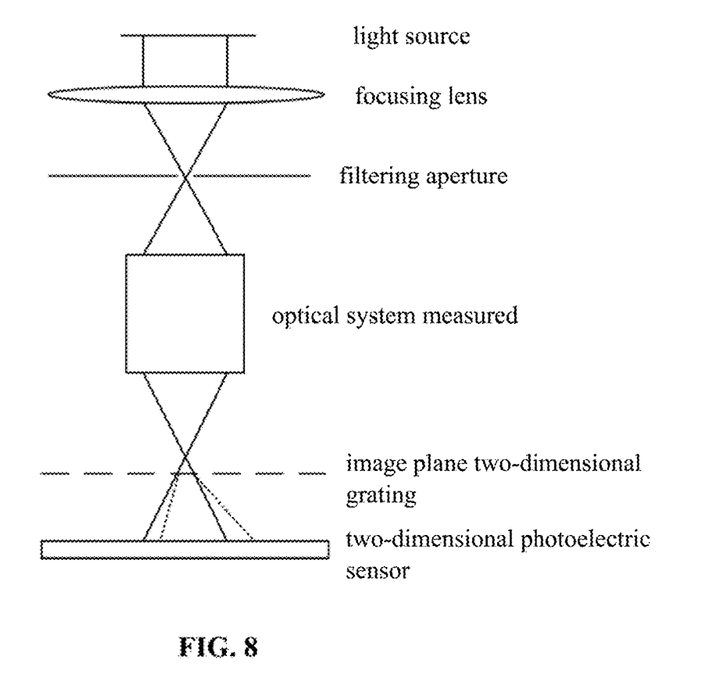
FIG. 8 shows the experimental light path related to Example 1 of the present invention.

Wave aberration of an optical system to be measured is measured by using a grating four-wave shear interferometer as shown in FIG. 8. A focusing lens, a filtering aperture, an optical system to be measured, a two-dimensional grating (with a period of 36 μm, same in both the X and Y directions), and a two-dimensional photoelectric sensor are sequentially arranged along the light-ray-propagation direction of the light source (wavelength λ=532 nm); a center of the filtering aperture coincides with a rear focal point of the focusing lens and an object-side field-of-view point to be measured of the optical system to be measured; the two-dimensional grating is positioned near the rear focal plane of the optical system to be measured and is parallel to the rear focal plane; the two-dimensional photoelectric sensor is positioned behind the two-dimensional grating and is parallel to the two-dimensional grating, and a distance from the two-dimensional photoelectric sensor to the image plane grating meets the requirement that a sampling number of diffraction light rays of the 0 order is 256×256 pixels. The steps of the measurement are as follows:

(1) a grating four-wave shear interferometer is used for generating a differential wavefront interferogram of the wave aberration of the projection objective lens system to be measured in the X-direction and the Y-direction, and the two-dimensional photoelectric sensor is used for receiving the interferograms $I_x(x_d, y_d)$ and $I_y(x_d, y_d)$;

(2) the interferogram is subjected to FFT transformation to obtain a corresponding frequency spectrum, a first-order frequency spectrum in the X-direction and the Y-direction is filtered out of the frequency spectrum, the first-order frequency spectrum is translated to the center to carry out inverse FFT transformation and phase unwrapping to obtain differential phases $S_x(x_d, y_d)$ and $S_y(x_d, y_d)$ of the diffracted wavefronts of −1 and +1 orders in the X-direction and the Y-direction;

(3) the paths of the diffracted light rays of the −1 and +1 orders in the case of shearing in the X-direction and the Y-direction are deemed as coming from different point sources, and the corresponding pupil pane coordinates are directly derived through calculation according to the pixel coordinates of the detector, thereby obtaining the corresponding position coordinates of light rays received by different pixels on a two-dimensional photoelectric sensor plane in the pupil plane, wherein the position coordinates obtained in the case of shearing in the X-direction are $(x_{-1x}, y_{-1x})$ and $(x_{+1x}, y_{+1x})$ and the position coordinates obtained in the case of shearing in the Y-direction are $(x_{-1y}, y_{-1y})$ and $(x_{+1y}, y_{+1y})$;

(4) first 100 Taylor polynomials are selected to build a set of equations according to the obtained coordinate systems $(x_{-1x}, y_{-1x})$, $(x_{+1x}, y_{+1x})$, $(x_{-1x}, y_{-1x})$, and $(x_{+1y}, y_{+1y})$, and solving to obtain a Taylor coefficient $C_i$ (i=1, 2, ..., 100) corresponding to each Taylor polynomial when the wavefront to be measured is expressed by the selected Taylor polynomials;

specifically, a set of equations is built for the differential phases $S_{xk}$ and $S_{yk}$ in the X-direction and Y-direction detected on a k-th pixel of the two-dimensional photoelectric sensor:

$$S_{xk} = \sum_{i=1}^{100} C_i \cdot \left(Z_{ik}^{+1x} - Z_{ik}^{-1x}\right)$$

$$S_{yk} = \sum_{i=1}^{100} C_i \cdot \left(Z_{ik}^{+1y} - Z_{ik}^{-1y}\right),$$

where upper right corner indices +1x, −1x, +1y, and −1y of Z respectively indicate that a value of a corresponding term is derived by substituting a k-th coordinate point in the coordinate systems $(x_{-1x},y_{-1x})$, $(x_{+1x},y_{+1x})$, $(x_{-1x},y_{-1x})$, and $(x_{+1y},y_{+1y})$ into a selected i-th Taylor polynomial expression; a lower right corner index i represents the i-th Taylor polynomial, and k represents that the value of the term is a value corresponding to the k-th coordinate in the selected coordinate system; data detected by all pixels on the two-dimensional photoelectric sensor are sorted to obtain a set of equations as follows:

$$\begin{vmatrix} Z_{11}^{+1x}-Z_{11}^{-1x} & Z_{21}^{+1x}-Z_{21}^{-1x} & & Z_{100,1}^{+1x}-Z_{100,1}^{-1x} \\ Z_{12}^{+1x}-Z_{12}^{-1x} & Z_{22}^{+1x}-Z_{22}^{-1x} & \cdots & Z_{100,2}^{+1x}-Z_{100,2}^{-1x} \\ \vdots & \vdots & & \vdots \\ Z_{1k}^{+1x}-Z_{1k}^{-1x} & Z_{2k}^{+1x}-Z_{2k}^{-1x} & & Z_{100,k}^{+1x}-Z_{100,k}^{-1x} \\ Z_{11}^{+1y}-Z_{11}^{-1y} & Z_{21}^{+1y}-Z_{21}^{-1y} & & Z_{100,1}^{+1y}-Z_{100,1}^{-1y} \\ Z_{12}^{+1y}-Z_{12}^{-1y} & Z_{22}^{+1y}-Z_{22}^{-1y} & \cdots & Z_{100,2}^{+1y}-Z_{100,2}^{-1y} \\ \vdots & \vdots & & \vdots \\ Z_{1,65536}^{+1y}-Z_{1,65536}^{-1y} & Z_{2,65536}^{+1y}-Z_{2,65536}^{-1y} & \cdots & Z_{100,65536}^{+1y}-Z_{100,65536}^{-1y} \end{vmatrix} \cdot \begin{vmatrix} C_1 \\ C_2 \\ \vdots \\ C_{100} \end{vmatrix} = \begin{vmatrix} S_{x1} \\ S_{x2} \\ \vdots \\ S_{x,65536} \\ S_{y1} \\ S_{y2} \\ \vdots \\ S_{y,65536} \end{vmatrix},$$

and
a least-square solution of the above set of equations is solved to obtain the coefficient $C_i$;

(5) A reconstructed wavefront $W_F$ obtained from the coefficient solution $C_i$ is:

$$W_F = \sum_{i=1}^{100} C_i Z_i,$$

where $Z_i$ represents the i-th Taylor polynomial; and
(6) The reconstruction result $W_F$ is output.

In the present invention, the method calculates and derives a transformation relation between a coordinate system of a wavefront to be measured in a pupil plane and a coordinate system of each diffracted wavefront in a detector plane by tracking an light path of each diffracted wavefront; a correspondence relation between a shear phase detected at each position on the detector plane and the phase in the wavefront to be measured can be obtained from the transformation relation between coordinate systems, a corresponding wavefront polynomial set can then be built, and a result of polynomial fitting for the wavefront to be measured can be obtained by fitting, whilst compensating the distortion of the pupil coordinate system and the shear amount change.

We claim:

1. A method for simultaneously compensating pupil coordinate distortion and shear amount change in a process of wavefront reconstruction in grating transverse shear interference, comprising:

(1) generating a differential wavefront interferogram of an optical system to be measured in X and Y-directions by using a grating transverse shear interferometer, and receiving differential wavefront interferograms $I_x(x_d, y_d)$ and $I_y(x_d,y_d)$ by using a two-dimensional photoelectric sensor, wherein $(x_d,y_d)$ is a pixel position coordinate system on the two-dimensional photoelectric sensor;

(2) extracting diffracted wavefronts of $n_1$-order and $n_2$-order, and differential phases $S_x(x_d,y_d)$ and $S_y(x_d,y_d)$ in X and Y-directions from the generated differential wavefront interferograms, wherein $n_1 \ne n_2$ and both are an integer;

(3) using an inversing method to solve corresponding position coordinates of light rays received by different pixels on a plane of the two-dimensional photoelectric sensor a pupil plane along diffraction light paths of the $n_1$ and $n_2$ orders in the case of shearing in the X-direction and the Y-direction, respectively, wherein the position coordinates obtained in the case of shearing in the X-direction are $(x_{n1x},y_{n1x})$ and $(x_{n2x},y_{n2x})$, and the position coordinates obtained in the case of shearing in the Y-direction are $(x_{n1y},y_{n1y})$ and $(x_{n2y},y_{n2y})$;

(4) selecting first m (m>1) polynomials to build a set of equations according to the obtained coordinate systems $(x_{n1x},y_{n1x})$, $(x_{n2x},y_{n2x})$, $(x_{n1y},y_{n1y})$, $(x_{n2y},y_{n2y})$, and solving to obtain a coefficient $C_i$ (i=1, 2, . . . , m) corresponding to each polynomial when the wavefront to be measured is expressed by the selected polynomials; and (5) reconstructing a wavefront $W_F$ according to the following Equation:

$$W_F = \sum_{i=1}^{m} C_i Z_i,$$

wherein $Z_i$ represents an i-th polynomial.

2. The method of claim 1, wherein the grating transverse shear interferometer is a four-wave grating shear interferometer, a Talbot grating shear interferometer, or a Ronchi grating shear interferometer.

3. The method of claim 1, wherein the differential phase of the diffracted wavefronts of the $n_1$ and $n_2$ orders is the differential phase between the diffracted wavefronts of 0 and ±1 orders, respectively, or the differential phase between the diffracted wavefronts of the −1 and +1 orders.

4. The method of claim 1, wherein the inversing method used is a light ray tracing method or an iterative method.

5. The method of claim 1, wherein the polynomial is a Zernike polynomial, a differential Taylor polynomial, or a Seidel aberration expression.

6. The method of claim 1, wherein the process of solving the coefficient $C_i$ in step (4) comprises the steps of
building a set of equations for the differential phases $S_{xk}$ and $S_{yk}$ in the X-direction and Y-direction detected on a k-th pixel of the two-dimensional photoelectric sensor:

$$S_{xk} = \sum_{i=1}^{m} C_i \cdot \left( Z_{ik}^{n1x} - Z_{ik}^{n2x} \right)$$

$$S_{yk} = \sum_{i=1}^{m} C_i \cdot \left( Z_{ik}^{n1y} - Z_{ik}^{n2y} \right),$$

wherein upper right corner indices n1x, n2x, n1y, and n2y of Z respectively indicate that a value of a corresponding term is derived by substituting a k-th coordinate point in the coordinate systems $(x_{n1x},y_{n1x})$, $(x_{n2x},y_{n2x})$, $(x_{n1y},y_{n1y})$, and $(x_{n2y},y_{n2y})$ into a selected i-th polynomial expression; a lower right corner index i represents the i-th polynomial, and k represents that the value of the term is a value corresponding to the k-th coordinate in the selected coordinate system;

sorting data detected by all pixels on the two-dimensional photoelectric sensor to obtain a set of equations as follows:

$$\begin{vmatrix} Z_{11}^{n1x}-Z_{11}^{n2x} & Z_{21}^{n1x}-Z_{21}^{n2x} & & Z_{i1}^{n1x}-Z_{i1}^{n2x} \\ Z_{12}^{n1x}-Z_{12}^{n2x} & Z_{22}^{n1x}-Z_{22}^{n2x} & \ldots & Z_{i2}^{n1x}-Z_{i2}^{n2x} \\ \vdots & \vdots & & \vdots \\ Z_{1k}^{n1x}-Z_{1k}^{n2x} & Z_{2k}^{n1x}-Z_{2k}^{n2x} & & Z_{ik}^{n1x}-Z_{ik}^{n2x} \\ Z_{11}^{n1y}-Z_{11}^{n2y} & Z_{21}^{n1y}-Z_{21}^{n2y} & \ldots & Z_{i1}^{n1y}-Z_{i1}^{n2y} \\ Z_{12}^{n1y}-Z_{12}^{n2y} & Z_{22}^{n1y}-Z_{22}^{n2y} & & Z_{i2}^{n1y}-Z_{i2}^{n2y} \\ \vdots & \vdots & & \vdots \\ Z_{1k}^{n1y}-Z_{1k}^{n2y} & Z_{2k}^{n1y}-Z_{2k}^{n2y} & \ldots & Z_{ik}^{n1y}-Z_{ik}^{n2y} \end{vmatrix} \cdot \begin{vmatrix} C_1 \\ C_2 \\ \vdots \\ C_i \end{vmatrix} = \begin{vmatrix} S_{x1} \\ S_{x2} \\ \vdots \\ S_{xk} \\ S_{y1} \\ S_{y2} \\ \vdots \\ S_{yk} \end{vmatrix},$$

and solving a least-square solution of the above set of equations, i.e., the coefficients $C_i$.

\* \* \* \* \*